United States Patent Office 3,355,967
Patented Dec. 5, 1967

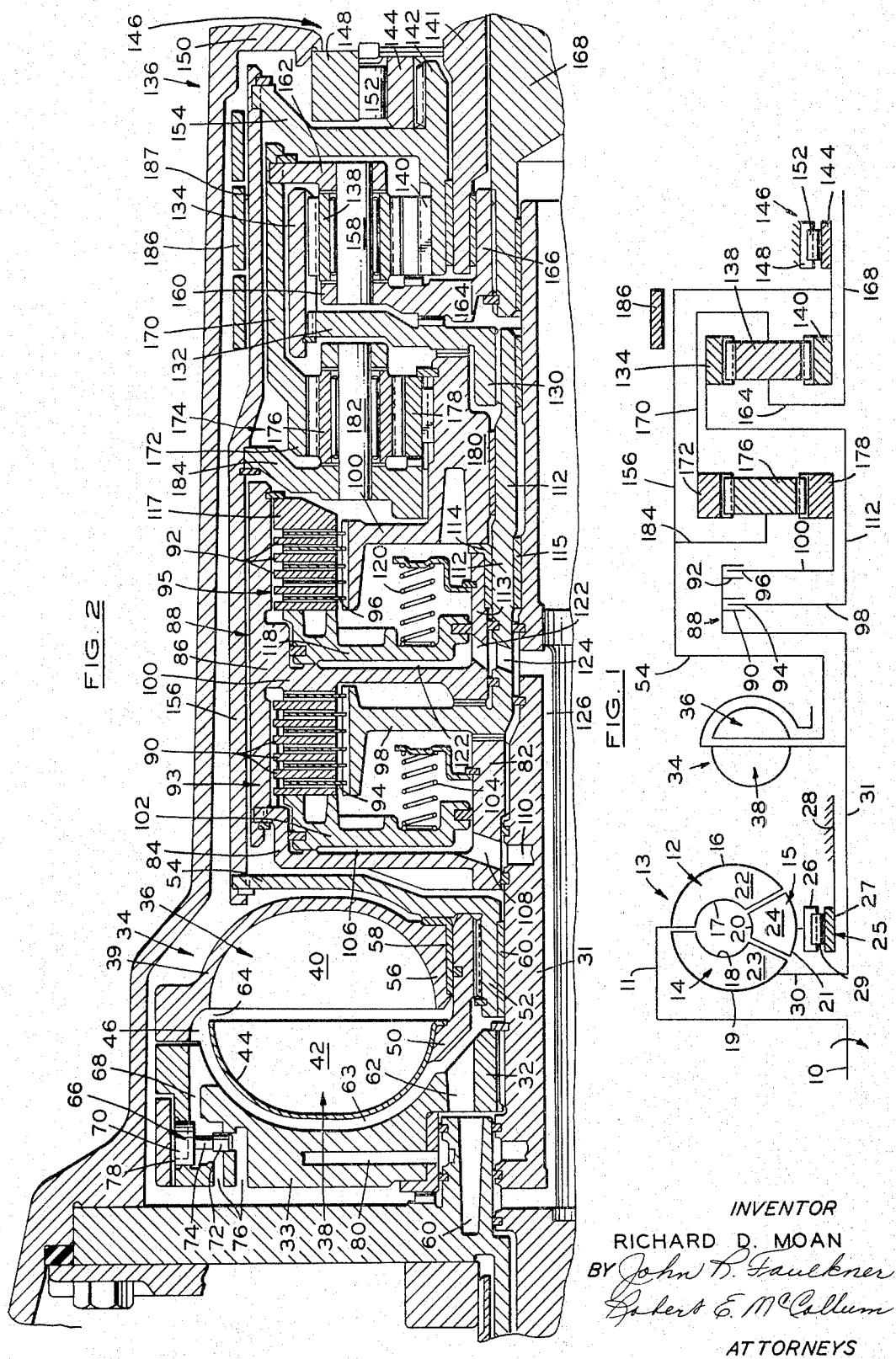

3,355,967
TRANSMISSION
Richard D. Moan, Dearborn, Mich., assignor to Ford Motor Company, Dearborn, Mich., a corporation of Delaware
Filed Nov. 9, 1964, Ser. No. 409,641
6 Claims. (Cl. 74—688)

This invention relates to an automatic transmission for use in a motor vehicle. More particularly, it relates to a two-speed automatic transmission that not only has a fixed reduction drive speed ratio, but provides an extremely smooth shift to a direct drive by the use of a selectively operable hydrodynamic drive device.

One of the objects of the invention is to provide an automatic transmission construction that is simple in construction, and yet has the advantages of both mechanical and hydraulic drives by providing a fixed reduction drive speed ratio for low speed, thereby improving torque and efficiency of operation, and an infinitely variable speed hydraulic change from the fixed ratio to a mechanical direct drive.

Another object of the invention is to provide a two-speed automatic transmission construction that establishes a mechanical direct drive through a number of interconnected planetary gearsets by providing a combined hydraulic-mechanical differential drive of the gearsets until the direct drive lockup point is reached, at which time the gearsets are mechanically coupled together to establish a drive eliminating the hydraulic power losses.

Another object of the invention is to provide an automatic transmission consisting of a high performance hydraulic torque converter combined with an extremely smoothly shifted gear train to provide a plurality of forward speed drives and a reverse drive, as well as engine or hill braking and overrun coasting.

Other objects, features and advantages will become apparent upon reference to the succeeding, detailed description of the invention and to the drawings illustrating the preferred embodiment thereof; wherein, FIGURE 1 illustrates schematically a cross-sectional view of one-half of a transmission embodying the invention; and FIGURE 2 shows a cross-sectional view of the details of construction of a portion of the transmission of FIGURE 1.

FIGURE 1 shows the general arrangement of a transmission embodying the invention, while FIGURE 2, which is essentially to scale, shows the details. The transmission, in general, has a power input shaft 10 that is adapted to be driven by any suitable source of power, such as, for example, the output shaft of an internal combustion engine of the motor vehicle type. Shaft 10 is drivingly connected by a cover member 11 to the impeller or pump 12 of a hydraulic torque converter 13.

Converter 13 is of a known high performance type and includes a turbine 14 and a stator member 15. Each of the pump, turbine and stator members are made up of inner and outer annular shrouds 16, 17; 18, 19; 20, 21; between which are secured circumferentially spaced blades 22, 23, 24. The shrouds together define a toroidal flow passage for the counterclockwise circulation of fluid from pump 12 to turbine 14 and back again through stator 15 in a known manner to multiply torque at low speeds of operation of input shaft 10, while operating substantially as a fluid coupling at higher engine speeds.

Stator 15 is prevented from rotating in a counterclockwise or reverse direction (into the plane of the drawing) by a mechanical one-way brake 25. This brake is of a known type. It has an outer annular race 26 fixed to stator shroud 21, and an inner annular race 27 fixed to a stationary portion 28 of the transmission housing, the races being separated by a number of spaced rollers or sprags 29. The sprags move to a position wedging the two races together to hold the stator stationary upon counterclockwise rotation of stator 15, while forward or clockwise rotation of the stator moves the sprags to inoperative positions permitting rotation of the stator in this direction.

Turbine 14 is connected by a flange 30 to one end of an intermediate shaft 31. As best seen in FIGURE 2, the intermediate shaft extends through the transmission and is splined at its forward end to the hub 32 of an impeller housing 33. The housing encloses a fluid coupling 34 that consists of an impeller or pump 36 and a turbine 38. The impeller has an annular shroud 39 formed as a portion of housing 33, and a number of spaced blades 40 secured to the shroud. Blades 40 face a set of similarly shaped spaced turbine blades 42 secured to an annular shroud 44 within an opening 46 in housing 33. Shroud 44 has a hub 50 splined to a cylindrical extension 52 of a disc-like torque transmitting member 54. Extension 52 and turbine hub 50 are rotatably mounted between the impeller hub 56 and intermediate shaft 31 by bearing members 58 and 60.

Fluid coupling 34 is of the selectively fill and empty type. That is, it is adapted to be filled with operating fluid at times to accelerate turbine 38 approximately to the speed of pump 36 to transmit the torque thereof to disc-like member 54. At other times, the coupling can be emptied of operating fluid to prevent the transmission of the driving torque of the pump to member 54.

The coupling is filled by the flow of fluid under presssure through connected passages 60 and 62 into the space 63 between turbine shroud 44 and housing 33. It then flows into the coupling through the clearance space 64 between the turbine and impeller outer peripheries. The supply of fluid to passage 60 can be from any suitable fluid pressure control system, not shown.

Control of the torque transmitting capabilities of the coupling is provided by a fluid discharge control valve 66 that is radially slidably mounted in impeller housing 33. This valve controls the exhaust of operating fluid from the coupling through a lateral passage 68. The valve is of the spool type, and has large and smaller diameter lands 70 and 72 connected by a neck portion 74 of reduced diameter. During rotation of housing 33, centrifugal force acting on the mass of valve 66 is generally sufficient to maintain it in the open position shown whereby passage 68 is connected to a sump or exhaust passage 76. Valve 66 is moved downwardly to a closed position blocking passage 68 by fluid under pressure admitted to act against the top face 78 of the valve. The fluid for this purpose is supplied through a bore 80 connected, by means not shown, to the coupling fill passage 60.

In operation, when it is desired to fill coupling 34 to transmit the torque of intermediate shaft 31 to disc-like member 54, fluid is admitted through passages 60 and 62 to fill the coupling with operating fluid. Simultaneously, fluid under pressure flows through passage 80 to the top of valve 66 moving it downwardly to shut off passage 68. The coupling then fills. Rotation of pump 36 then accelerates turbine 38 to approximately the same speed. When an interruption in the transmission of torque to member 54 is desired, the supply of fluid under pressure to lines 60 and 80 is cut off by the control system, not shown, thereby permitting centrifugal force acting on valve 66 to move it to the position shown. The centrifugal force acting on the rotating mass of fluid in the coupling then centrifuges it outwardly through passage 68 to the sump. Additionally, once turbine 38 begins to slow down, the impeller 36 then pumps the fluid out through passage 68.

Intermediate shaft 31 is also splined to the hub 82 of a torque transmitting disc 84. Disc 84 is splined or otherwise secured at its outer edge to one edge of a drum-like member 86. This latter member constitutes the driving portion of a dual friction clutch unit 88. This unit has two spaced sets of annular friction discs 90 and 92 each splined internally to drum 86 and interleaved with similar sets of friction discs 94 and 96 splined, respectively, to driven discs 98 and 100. Each of the clutch units is of a known fluid pressure actuated, spring released type. Wave springs (not shown) between the discs normally separate them so that no torque will be transmitted from drum 86 to either of discs 98 or 100.

Discs 90, 94 are axially slidably located between an annular extension 100 of driving clutch member 86 and an annular piston 102. The piston is axially slidably mounted on hub 82, and is biased to an inoperative position by a spring 104. The piston is moved to the right to engage discs 90, 94 by admitting fluid under pressure to the annular space 106 behind the piston from bore 108 in hub 82 and bore 110 in shaft 31. Bore 110 would be connected to the fluid pressure control system. Driven clutch member 98 connected to discs 94 is rotatably located between the hub 82 and extension 100, and is integral with the end of a drive shaft 112. This latter shaft is rotatably mounted between the hub 113 of extension 100 and shaft 31 on bearing members 114 and 115.

The clutch unit comprising clutch disc 92 and 96 is constructed in a manner similar to that described for the discs 90 and 94. That is, the discs 92, 96 are axially slidably located between an annular pressure plate 117 splined to member 86 and an annular piston 118. The piston 118, like piston 102, is slidable on hub 113, and normally biased to an inoperative position by a spring 120. Fluid under pressure admitted to chamber 122 behind piston 118 moves the piston to compress the discs 92 and 96, and drive disc 100 at the speed of member 86. The fluid is supplied through interconnected bores 122 and 124 in hub 113 and shaft 112, respectively, and a central bore 126 in shaft 31. The clutch discs 92, 96 are normally spaced from each other by wave springs (not shown) between the discs so that when the piston 118 is in its inoperative or leftward position, no drive will be transmitted between member 86 and disc 100.

Shaft 112 is splined to the hub 130 of a driving flange 132. The flange is fixed at its other end to an extension of a ring gear 134 constituting one element of a planetary gearset 136. The gearset includes a number of spaced planet pinion gears 138 in mesh with the ring gear and a sun gear 140. Pinion gears 138 are rotatably mounted on pinion shafts 158 that are fixed in spaced portions 160 and 162 of a rotatable annular carrier 164. The carrier portion 160 has a hub 166 splined to a power output shaft 168.

Sun gear 140 is rotatably mounted upon an extension 141 of the stationary transmission housing, and has an axial extension 142. Extension 142 is splined to the inner annular race 144 of a one-way or overrunning brake 146. This brake is of a known mechanical type having an outer annular race 148 secured to housing 150 and separated from race 144 by a number of spaced rollers or sprags 152. The brake prevents counterclockwise rotation of sun gear 140 by sprags 152 moving to a position wedging races 144 and 148 together, while permitting free rotation of the sun gear in a forward or clockwise direction by movement of the sprags to inoperative position.

Sun gear 140 also has a radial extension 154 fixed to a drum-like member 156 enclosing the gear train and clutch packs. This latter member is drivingly fixed to the end of disc 54 that is driven at times by turbine 38.

The portion 162 of carrier 164 is fixed to a drum-like extension 170 of a second ring gear 172. This latter ring gear constitutes one element of a second planetary gearset 174. The gearset includes a number of spaced planet pinion gears 176 meshing with ring gear 172 and a sun gear 178 keyed to hub 180 of driven disc member 100. The planet pinion gears 176 are rotatably mounted on pinion shafts 182 fixed in spaced portions of an annular carrier 184. Carrier 184, like sun gear 140, is fixed to the drum-like member 156.

Drum member 156 is adapted to be held stationary at times by an annular friction brake band 186 to condition the gearsets for a positive two-way forward reduction drive or a reverse drive. This band is shown as being of the triple-wrap type, and has an internal friction surface 187 adapted to cooperate with the outer friction surface of member 156 to prevent rotation of sun gear 140 and carrier 184. This brake is of a known fluid pressure actuated, spring released type.

In operation, the transmission is capable of providing a low or first speed forward reduction drive, a hydraulic direct drive, a mechanical forward direct drive, a reverse drive, neutral, and hill or coast braking.

Neutral is established by emptying coupling 34 and disengaging clutch units 93 and 95. Coupling 34 is emptied by terminating the supply of actuating pressure to the top of valve 66, thereby causing any fluid that might enter the coupling to be centrifuged out to the sump through passage 68 and 76. No drive is therefore transmitted from shaft 31 to the planetary gearsets or to the output shaft 168.

First or low speed forward reduction drive is established by engaging clutch unit 93 alone. Clockwise rotation of power input shaft 10 in the direction of arrow 188 (FIGURE 1) rotates impeller 12 of torque converter 13 in the same direction to drive turbine 14 and intermediate shaft 31 forwardly. At low speeds, fluid leaves the turbine blades 23 at a rearward angle striking the front portions of the stator blades 24, thereby causing stator 15 to attempt to rotate in a reverse direction. This is prevented by engagement of one-way brake 25. Torque multiplication, therefore, occurs in converter 13.

The forward or clockwise rotation of intermediate shaft 31 at a reduced speed rotates rear unit gear 134 in the same direction by means of engaged clutch unit 93. Since output shaft 168 is stationary, it acts temporarily as a reaction member causing pinion gears 138 to attempt to rotate clockwise and drive sun gear 140 in a reverse or counterclockwise direction. This latter rotation, however, is prevented by the engagement of one-way brake 146. Accordingly, pinion gears 138 are forced to walk around stationary sun gear 140 and drive carrier 164 and output shaft 168 in a forward direction at a speed reduced from that of input shafts 10 and 31.

If, during this low speed drive range, a coast condition of the vehicle should occur, i.e., the output shaft 168 rotates faster in a forward direction than it is being driven by carrier 164, the carrier attempts to overdrive sun gear 140 in a forward direction. This would normally unlock the one-way brake 146 and cause a runaway condition of the output shaft 168. To prevent this, brake band 186 may be applied, thus holding sun gear 140 stationary. This maintains the reduction drive through the gearset to provide an engine braking effect by the drive of intermediate shaft 31 and input shaft 10 faster than they are being rotated by the engine.

At the desired time, a shift is made from the low speed drive described to a direct drive coupling the intermediate shaft 31 and output shaft 168. The change-over between those two speed ranges, however, is made in an extremely smooth manner by filling coupling 34 to initially provide a progressively increasing differential drive to the gearsets and subsequently engaging the clutch unit 95 to bypass the fluid coupling and provide a direct mechanical connection between the intermediate and output shafts 31 and 168.

When the control system receives a signal, such as driven shaft speed responsive governor pressure, for example, that it is appropriate to change to a direct drive, fluid is admitted to fluid coupling 34 through passages 60, 62 and 80 to fill the coupling and move the coupling exhaust valve 66 down to a closed position. The clutch unit 93 having previously been engaged for first speed operation, the slow and smooth acceleration of turbine 38 up to the speed of pump 36 and shaft 31 smoothly accelerates sun gear 140 and carrier 184 forwardly, this action being permitted by the unlocking of brake 146. In a short time, the speeds of sun gear 140 and carrier 184 approach that of carrier 164 and ring gear 172, thereby causing all of the gearset members to rotate substantially at the same speeds and at the speed of intermediate shaft 31. Clutch unit 95 is then engaged in timed relationship to the attainment of sun gear 140 of a speed approximately equal to that of the carrier 162. The sun gear 178 is then driven at the same speed as ring gear 134, and a positive lockup of both planetary gearsets is effected to provide a direct mechanical drive from intermediate shaft 31 to output shaft 168. The fluid coupling 34 may then be emptied to reduce hydraulic power losses.

Torque converter 13 at this time is operating in its coupling range, the non-forward angle of discharge of fluid from the faster rotating turbine 74 striking the backs of the stator blades and rotating them forwardly off one-way brake 25 at the speed of turbine 14. The turbine 74, therefore, is now rotating approximately at the speed of pump 12 and merely transmits the torque of pump 12 to shaft 31 without torque multiplication.

A reverse drive is obtained by emptying clutch unit 34, in the manner previously described, engaging clutch unit 95, disengaging clutch unit 93, and engaging brake band 186. The reverse drive is obtained through the front unit gearset 174. A forward rotation of input shaft 10 drives the torque converter pump and turbine members 14 and 18 in the same direction to rotate shaft 31 and sun gear 178 in the same direction. The torque converter at this time is conditioned for its torque multiplying operation due to the low speed of turbine 14, and stator 20 is held stationary by brake 25. Since brake band 186 holds carrier 184 stationary, clockwise rotation of sun gear 178 rotates pinion gears 176 counterclockwise to rotate ring gear 172 and rear unit carrier 164 in a reverse direction. The output shaft 178, therefore, rotates in a counterclockwise or reverse direction at a speed reduced from that of shaft 31.

From the foregoing, it will be seen that the invention provides a two-speed automatic transmission that establishes a fixed speed ratio reduction drive and an extremely smooth shift to a mechanical direct drive that is affected by the progressive differential drive of the gearsets by a controllable fluid coupling.

While the invention has been illustrated in its preferred embodiment in the figures, it will be clear to those skilled in the arts to which the invention pertains that many changes and modifications may be made thereto without departing from the scope of the invention.

I claim:

1. A transmission having rotatable power input and output shafts, and means operatively connecting said shafts, said means including a selectively operable hydrodynamic drive device and a plurality of interconnected planetary gearsets, said drive device having a plurality of rotatable elements including a pump and a turbine, means connecting said pump to said input shaft, said gearsets each having a plurality of rotatable members, means operably connecting said turbine to a first member of each gearset, disengageable brake means connected to and holding said first members against rotation, first means operatively connecting said input shaft to a second member of one gearset, selectively operable means operably connecting said input shaft to a second member of another of said gearsets, and means connecting another member of each of said gearsets to each other and to said output shaft for providing: first, a reduction drive by the transmission of torque through said transmission in one path from said input shaft to said output shaft through said pump and first means and one gearset second member when said selectively operable means and hydrodynamic drive device are inoperable and said brake means holds said first members against rotation; secondly, subsequently establishing a fluid direct drive from said input shaft to said output shaft by additionally rendering operable said drive device and disengaging said brake means for the transmission of torque simultaneously through said first path and through a second path including said turbine and first members of each gearset; and, thirdly, subsequently establishing a direct mechanical drive from said input shaft to said output shaft by the subsequent rendering operable of said selectively operable means for the transmission of torque simultaneously through said first path and a third path, said latter path including said pump and second member of said another gearset, thereby bypassing the transmission of torque through said second path.

2. A transmission having rotatable power input and output shafts, and means operatively connecting said shafts, said means including a selectively operable hydrodynamic drive device and a plurality of interconnected planetary gearsets, said drive device having a plurality of rotatable elements including a pump and a turbine, means connecting said pump to said input shaft, said gearsets each having a plurality of rotatable members, means operably connecting said turbine to a first member of each gearset, disengageable brake means connected to and holding said first members against rotation, releasable means operatively connecting said input shaft to a second member of one gearset, selectively operable means operably connecting said input shaft to a second member of another of said gearsets, and means connecting another member of each of said gearsets to each other and to said output shaft for providing: first, a reduction drive in one direction by the transmission of torque through said transmission in one path from said input shaft to said output shaft through said pump and first means and one gearset second member when said selectively operable means and hydrodynamic drive device are inoperable and said brake means holds said first members against rotation; secondly, subsequently establishing a fluid direct drive from said input shaft to said output shaft by additionally rendering operable said drive device and disengaging said brake means for the transmission of torque simultaneously through said first path and through a second path including said turbine and first members of each gearset; and, thirdly, subsequently establishing a direct mechanical drive from said input shaft to said output shaft by the subsequent rendering operable of said selectively operable means for the transmission of torque simultaneously through said first path and a third path, said latter path including said pump and second member of said another gearset, thereby bypassing the transmission of torque through said second path, the release of said releasable means and engagement of said brake means and operability of said selectively operable means providing a drive in a reverse direction through said transmission during inoperativeness of said drive device.

3. A transmission having rotatable power input and output shafts, and means operatively connecting said shafts, said means including a selectively operable hydrodynamic drive device and a plurality of interconnected planetary gearsets, said drive device having a plurality of rotatable elements including a pump and a turbine, means connecting said pump to said input shaft, said gearsets each having a plurality of rotatable members including drive and driven and reaction members, means operably connetcing said turbine to the reaction members of each gearset, disengageable brake means connected to and holding said reaction members against rotation, releasable means operatively connecting said input shaft to a drive member of one gearset, selectively operable means operably connecting said input shaft to a drive member of another of said gearsets, and means connecting the driven members of each of said gearsets to each other and to said output shaft for providing: first, a reduction drive by the transmission of torque through said transmission in one path from said input shaft to said output shaft through said pump and releasable means and drive member of said one gearset when said selectively operable means and hydrodynamic drive device are inoperable and said brake means holds said reaction members against rotation; secondly, subsequently establishing a fluid direct drive from said input shaft to said output shaft by additionally rendering operable said drive device and disengaging said brake means for the transmission of torque simultaneously through said first path and through a second path including said turbine and reaction members of each gearset; and, thirdly, subsequently establishing a direct mechanical drive from said input shaft to said output shaft by the subsequent rendering operable of said selectively operable means for the transmission of torque simultaneously through said first path and a third path, said latter path including said pump and drive member of said another gearset, thereby bypassing the transmission of torque through said second path.

4. A transmission having rotatable power input and output shafts, and means operatively connecting said shafts, said means including a selectively operable hydrodynamic drive device and a plurality of interconnected planetary gearsets, said drive device having a plurality of rotatable elements including a pump and a turbine, means connecting said pump to said input shaft, said gearsets each having a plurality of rotatable members including drive and driven and reaction members, means operably connecting said turbine to the reaction members of each gearset, disengageable brake means connected to and holding said reaction members against rotation, releasable means operatively connecting said input shaft to a drive member of one gearset, selectively operable means operably connecting said input shaft to a drive member of another of said gearsets, and means connecting the driven members of each of said gearsets to each other and to said output shaft for providing: first, a reduction drive in one direction by the transmission of torque through said transmission in one path from said input shaft to said output shaft through said pump and releasable means and drive member of said one gearset when said selectively operable means and hydrodynamic drive device are inoperable and said brake means holds said reaction members against rotation; secondly, subsequently establishing a fluid direct drive from said input shaft to said output shaft by additionally rendering operable said drive device and disengaging said brake means for the transmission of torque simultaneously through said first path and through a second path including said turbine and the reaction members of each gearset; and, thirdly, subsequently establishing a direct mechanical drive from said input shaft to said output shaft by the subsequent rendering operable of said selectively operable means for the transmission of torque simultaneously through said first path and a third path, said latter path including said pump and drive member of said another gearset, thereby bypassing the transmission of torque through said second path, the release of said releasable means and engagement of said brake means and operability of said selectively operable means providing a drive in a reverse direction through said transmission during inoperativeness of said drive device.

5. A transmission having rotatable power input and output shafts, and means operatively connecting said shafts, said means including a selectively operable hydrodynamic drive device and a plurality of interconnected planetary gearsets, said drive device having a plurality of rotatable elements including a pump and a turbine, means connecting said pump to said input shaft, said gearsets each having a plurality of rotatable members including a sun gear and a ring gear and a planet gear rotatably mounted on a carrier, means operably connecting said turbine to the carrier of a first gearset and to the sun gear of a second gearset, disengageable brake means connected to and holding said second gearset sun gear against rotation, releasable clutch means operatively connecting said input shaft to the ring gear of said second gearset, selectively operable clutch means operably connecting said input shaft to the sun gear of said first gearset, and means connecting the first gearset ring gear and second gearset carrier to each other and to said output shaft for providing: first, a reduction drive by the transmission of torque through said transmission in one path from said input shaft to said output shaft through said pump and releasable clutch means and second gearset ring gear when said selectively operable clutch means and hydrodynamic drive device are inoperable and said brake means holds said first gearset carrier and second gearset sun gear against rotation; secondly, subsequently establishing a fluid direct drive from said input shaft to said output shaft by additionally rendering operable said drive device and disengaging said brake means for the transmission of torque simultaneously through said first path and through a second path including said turbine and first gearset carrier and second gearset sun gear, and thirdly, subsequently establishing a direct mechanical drive from said input shaft to said output shaft by the subsequent rendering operable of said selectively operable clutch means for the transmission of torque simultaneously through said first path and a third path, said latter path including said pump and first gearset sun gear, thereby bypassing the transmission of torque through said second path.

6. A transmission having rotatable power input and output shafts, and means operatively connecting said shafts, said means including a selectively operable hydrodynamic drive device and a plurality of interconnected planetary gearsets, said drive device having a plurality of rotatable elements including a pump and a turbine, means connecting said pump to said input shaft, said gearsets each having a plurality of rotatable members including a sun gear and a ring gear and a planet gear rotatably mounted on a carrier, means operably connecting said turbine to the carrier of a first gearset and to the sun gear of a second gearset, disengageable brake means connected to and holding said second gearset sun gear against rotation, releasable clutch means operatively connecting said input shaft to the ring gear of said second gearset, selectively operable clutch means operable to connect said input shaft to the sun gear of said first gearset, and means connecting the first gearset ring gear and second gearset carrier to each other and to said output shaft for providing: first; a reduction drive in one direction by the transmission of torque through said transmission in one path from said input shaft to said output shaft through said pump and releasable clutch means and second gearset ring gear when said selectively operable clutch means and hydrodynamic drive device are inoperable and said brake means holds said first gearset carrier and second gearset sun gear against rotation; secondly, subsequently establishing a fluid direct drive from said input shaft to said output shaft by additionally rendering operable said drive device and disengaging said brake means for the transmission of torque simultaneously through said first path and through a second path including said turbine and first gearset carrier and second gearset sun gear; and, thirdly, subsequently establishing a direct mechanical drive from said input shaft to said output shaft by the subsequent rendering operable said selectively operable clutch means for the transmission of torque simultaneously through said first path and a third path, said latter path including said pump and first gearset sun gear, thereby bypassing the transmission of torque through said second path, the release of said releasable clutch means and engagement of said brake means and operability of said selectively operable clutch means providing a drive in a reverse direction through said transmission during inoperativeness of said drive device.

References Cited

UNITED STATES PATENTS

| | | | |
|---|---|---|---|
| 2,851,906 | 9/1958 | De Lorean. | |
| 2,873,618 | 2/1959 | De Lorean. | |
| 2,876,656 | 3/1959 | Herndon | 74—688 X |
| 2,968,197 | 1/1961 | De Lorean | 74—688 |
| 2,982,152 | 5/1961 | De Lorean | 74—688 |
| 3,004,451 | 10/1961 | Hensel | 74—688 |
| 3,025,721 | 3/1962 | De Lorean. | |
| 3,030,824 | 4/1962 | Moore | 74—677 |
| 3,049,937 | 8/1962 | Lindsay. | |
| 3,057,225 | 10/1962 | Snyder. | |
| 3,084,568 | 4/1963 | O'Malley | 74—677 |
| 3,095,764 | 7/1963 | Peras | 74—677 |
| 3,097,544 | 7/1963 | Evernden | 74—688 |
| 3,146,630 | 9/1964 | Ivey. | |
| 3,159,051 | 12/1964 | Herndon et al. | 74—688 X |
| 3,188,886 | 6/1965 | Jandesek | 74—688 |
| 3,253,688 | 5/1966 | Livezey | 74—720.5 X |

DONLEY J. STOCKING, *Primary Examiner.*

DAVID J. WILLIAMOWSKY, THOMAS C. PERRY,
*Examiners.*

J. R. BENEFIEL, *Assistant Examiner.*